(12) United States Patent
Nukui et al.

(10) Patent No.: US 11,692,072 B2
(45) Date of Patent: Jul. 4, 2023

(54) GLASS DIRECT ROVING AND LONG GLASS FIBER-REINFORCED THERMOPLASTIC RESIN PELLET

(71) Applicant: NITTO BOSEKI CO., LTD., Fukushima (JP)

(72) Inventors: Yosuke Nukui, Fukushima (JP); Yuta Takahashi, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 17/610,544

(22) PCT Filed: Nov. 27, 2020

(86) PCT No.: PCT/JP2020/044337
§ 371 (c)(1),
(2) Date: Nov. 11, 2021

(87) PCT Pub. No.: WO2021/199497
PCT Pub. Date: Oct. 7, 2021

(65) Prior Publication Data
US 2022/0145021 A1 May 12, 2022

(30) Foreign Application Priority Data
Mar. 30, 2020 (JP) .............................. JP2020-061121

(51) Int. Cl.
*C08J 5/04* (2006.01)
*C03C 13/00* (2006.01)

(52) U.S. Cl.
CPC .............. *C08J 5/043* (2013.01); *C03C 13/00* (2013.01); *C08J 2323/12* (2013.01); *C08J 2377/02* (2013.01)

(58) Field of Classification Search
CPC ..... C08K 7/14; B29B 9/06; B29B 9/14; C08J 5/08; C08J 5/043; B29C 48/05; C03C 25/40; C03C 13/00
See application file for complete search history.

(56) References Cited

U.S. PATENT DOCUMENTS

| 6,436,476 B1 * | 8/2002 | Sage, Jr. | C08K 9/06 427/428.01 |
| 2010/0313605 A1 * | 12/2010 | Soliman | B29B 9/16 65/442 |

FOREIGN PATENT DOCUMENTS

| EP | 1 375 103 A1 | 1/2004 |
| EP | 3 912 780 A1 | 11/2021 |
| JP | 2009-242551 A | 10/2009 |
| JP | 2010-202759 A | 9/2010 |
| JP | 2015-157740 A | 9/2015 |
| JP | 2018-150201 A | 9/2018 |
| JP | 2018-150650 A | 9/2018 |
| JP | 2019-167668 A | 10/2019 |
| WO | 2005/120438 A1 | 12/2005 |

OTHER PUBLICATIONS

Jacob et al (CN 107075143), published on Aug. 2017.*
Supplemental European search report dated May 25, 2022 issued in the corresponding EP Patent Application No. 20929149.1.
Database WPI, Week 201868, Sep. 27, 2018, Thomas Scientific, London, GB; AN 2018-751684 XP002806476.
Database WPI, Week 201561, Sep. 3, 2015, Thomson Scientific, London, GB; AN 2015-51303K, XP002806477.
Dtabase WPI, Week 201981, Oct. 3, 2019, Thomson Scientific, London, GB; AN 2019-83459G, XP002806478.

* cited by examiner

*Primary Examiner* — Gregory Listvoyb
(74) *Attorney, Agent, or Firm* — Carrier Shields & Associates, P.C.; Joseph P. Carrier; Anne G. Sabourin

(57) ABSTRACT

Provided is a glass direct roving that can achieve good productivity for long glass fiber-reinforced thermoplastic resin pellets, and achieve excellent spinning productivity and good strength of glass fiber-reinforced resin molded articles produced by using long glass fiber-reinforced thermoplastic resin pellets in combination. The glass direct roving includes a plurality of glass filaments bundled together, wherein the filament diameter of the glass filaments, D, is in the range of 17.5 to 21.5 μm, the number of the glass filaments bundled, F, is in the range of 3000 to 7000, the mass of the glass direct roving is in the range of 2450 to 4000 tex, the ignition loss of the glass direct roving, L, is in the range of 0.03 to 0.90%, and the D, F, and L satisfy the following formula (1):

$$1050 \leq (D^4 \times F^{1/4})/(1000 \times L^{1/6}) \leq 1640. \quad (1)$$

6 Claims, No Drawings

GLASS DIRECT ROVING AND LONG GLASS FIBER-REINFORCED THERMOPLASTIC RESIN PELLET

TECHNICAL FIELD

The present invention relates to a glass direct roving and a long glass fiber-reinforced thermoplastic resin pellet.

BACKGROUND ART

Glass fiber-reinforced resin molded articles are increasingly demanded as metal substitute materials. In particular, glass fiber-reinforced resin molded articles produced by using long glass fiber-reinforced thermoplastic resin pellets (LFT pellets), which contain a glass fiber bundle (glass direct roving) obtained by bundling thousands of continuous glass filaments at once and winding the bundled glass filaments (e.g., see Patent Literature 1), are attracting attention. Typically, the LFT pellets are obtained in such a manner that a glass roving is allowed to pass through a through hole of a die having a through hole formed therein together with a thermally melted matrix resin and drawn from the through hole, and the glass roving is then cut into pieces of predetermined length.

Glass fiber-reinforced resin molded articles produced by using LFT pellets have higher strength than glass fiber-reinforced resin molded articles produced by using common pellets, which are obtained by kneading glass chopped strands and resin, because glass fibers remaining in the glass fiber-reinforced resin molded articles produced by using LFT pellets are longer than those in the glass fiber-reinforced resin molded articles produced by using common pellets.

As shown in Patent Literature 1, glass direct rovings of 2400 tex (g/1000 m) composed of 4000 glass filaments with a fiber diameter of 17 μm bundled together are the current mainstream.

CITATION LIST

Patent Literature

Patent Literature 1: Japanese Patent Laid-Open No. 2009-242551

SUMMARY OF INVENTION

Technical Problem

For enhanced productivity for LFT pellets, glass direct rovings of a higher mass have been recently demanded. It is contemplated for enhancement of the mass of a glass direct roving to increase the number of glass filaments bundled constituting a glass direct roving or increase the fiber diameter of the glass filaments.

However, examination made by the present inventors has found a disadvantage that the increase in the number of the glass filaments bundled results in reduction in productivity for glass direct rovings (spinning productivity) and the increase in the fiber diameter of the glass filaments results in reduction in the strength of a glass fiber-reinforced resin molded article produced by using LFT pellets.

An object of the present invention is to provide a glass direct roving that, by solving the disadvantage, can achieve good LFT pellet productivity, and achieve excellent spinning productivity and good strength of glass fiber-reinforced resin molded articles produced by using LFT pellets in combination.

Further, an additional object of the present invention is to provide a long glass fiber-reinforced thermoplastic resin pellet (LFT pellet) containing the glass direct roving of the present invention.

Solution to Problem

To achieve the objects, the glass direct roving of the present invention is characterized by being a glass direct roving comprising a plurality of glass filaments bundled together, wherein the filament diameter of the glass filaments, D, is in the range of 17.5 to 21.5 μm, the number of the glass filaments bundled, F, is in the range of 3000 to 7000, the mass of the glass direct roving is in the range of 2450 to 4000 tex, the ignition loss of the glass direct roving, L, is in the range of 0.03 to 0.90%, and the D, F, and L satisfy the following formula (1):

$$1050 \leq (D^4 \times F^{1/4})/(1000 \times L^{1/6}) \leq 1640 \qquad (1)$$

By virtue of the configuration that the D, F, and L satisfy the formula (1), the glass direct roving of the present invention has excellent spinning productivity, and has good LFT pellet productivity and can impart good strength to glass fiber-reinforced resin molded articles produced by using LFT pellets. Here, having excellent spinning productivity means that production (spinning) of glass direct rovings can be carried out with the thread break frequency in production (spinning) being once/hour or lower. Having good LFT pellet productivity means that when production of LFT pellets is carried out at a conveyance speed of 20 to 50 m/min, LFT pellets can be produced with the frequency of breaking of a glass direct roving due to splitting or the like in a resin impregnation tank being once/8000 m or lower. Imparting good strength to a glass fiber-reinforced resin molded article produced by using LFT pellets means that the glass fiber-reinforced resin molded article has a strength of 95% or higher based on the strength (tensile strength, bending strength, and Charpy impact strength) of a glass fiber-reinforced resin molded article obtained in completely the same manner except that a glass direct roving of 2400 tex (g/1000 m) composed of 4000 glass filaments with a fiber diameter of 17.3 μm bundled together and having the same ignition loss is used.

It is preferable for the glass direct roving of the present invention that the attachment rate of a silane coupling agent, S, with respect to the total amount of the glass direct roving be in the range of 0.010 to 0.200%, and the D, F, L, and S satisfy the following formula (2):

$$375 \leq (D^4 \times F^{1/4} \times S^{1/3})/(1000 \times L^{1/6}) \leq 630 \qquad (2)$$

By virtue of the configuration that the D, F, L, and S satisfy the formula (2), the glass direct roving of the present invention more reliably has excellent spinning productivity, and more reliably has good LFT pellet productivity and can more reliably impart good strength to glass fiber-reinforced resin molded articles produced by using LFT pellets.

It is more preferable for the glass direct roving of the present invention that the D, F, L, and S satisfy the following formula (3):

$$400 \le (D^4 \times F^{1/4} \times S^{1/3})/(1000 \times L^{1/6}) \le 585 \quad (3)$$

By virtue of the configuration that the D, F, L, and S satisfy the formula (3), the glass direct roving of the present invention has excellent spinning productivity, and has excellent LFT pellet productivity and can impart good strength to glass fiber-reinforced resin molded articles produced by using LFT pellets. Here, having excellent LFT pellet productivity means that when production of LFT pellets is carried out at a conveyance speed of 20 to 100 m/min, LFT pellets can be produced with the frequency of breaking of a glass direct roving due to splitting or the like in a resin impregnation tank being once/8000 m or lower.

It is more preferable for the glass direct roving of the present invention that the D, F, L, and S satisfy the following formula (4):

$$405 \le (D^4 \times F^{1/4} \times S^{1/3})/(1000 \times L^{1/6}) \le 495 \quad (4)$$

By virtue of the configuration that the D, F, L, and S satisfy the formula (4), the glass direct roving of the present invention has excellent spinning productivity, and has excellent LFT pellet productivity and can impart excellent strength to glass fiber-reinforced resin molded articles produced by using LFT pellets. Here, imparting good strength to a glass fiber-reinforced resin molded article produced by using LFT pellets means that the glass fiber-reinforced resin molded article has a strength of 97% or higher based on the strength (tensile strength, bending strength, and Charpy impact strength) of a glass fiber-reinforced resin molded article obtained in the completely same manner except that a glass direct roving of 2400 tex (g/1000 m) composed of 4000 glass filaments bundled together with a fiber diameter of 17.3 μm and having the same ignition loss is used.

The long glass fiber-reinforced thermoplastic resin pellet of the present invention is characterized by comprising the glass direct roving of the present invention and a thermoplastic resin.

It is preferable for the long glass fiber-reinforced thermoplastic resin pellet of the present invention that the thermoplastic resin be polypropylene or polyamide.

DESCRIPTION OF EMBODIMENTS

Next, embodiments of the present invention will be described in more detail.

The glass direct roving of the present embodiment is a glass direct roving comprising a plurality of glass filaments bundled together, wherein the filament diameter of the glass filaments, D, is in the range of 17.5 to 21.5 μm, the number of the glass filaments bundled, F, is in the range of 3000 to 7000, the mass of the glass direct roving is in the range of 2450 to 4000 tex, the ignition loss of the glass direct roving, L, is in the range of 0.03 to 0.90%, and the D, F, and L satisfy the following formula (1):

$$1050 \le (D^4 \times F^{1/4})/(1000 \times L^{1/6}) \le 1640 \quad (1)$$

The glass direct roving of the present embodiment can be produced, for example, as follows.

First, a glass raw material (glass batch) prepared to have a predetermined glass composition based on components contained in ores to be the glass raw material and the contents of the components and the amounts of the components to be volatilized in the melting process is fed to a melting furnace, and melted, for example, at a temperature in the range of 1450 to 1550° C.

Then, the melted glass batch (molten glass) is drawn from 3000 to 7000 nozzle tips of a bushing controlled at a predetermined temperature, and rapidly cooled to form glass filaments, onto which a binder is applied, and 3000 to 7000 glass filaments are bundled together, thus providing a glass direct roving. Here, the filament diameter of the glass filaments (i.e., the diameter of the glass filaments) can be controlled by controlling the viscosity of the molten glass, the size of the aperture of each of the nozzle chips, and the speed of drawing the molten glass. In addition, allowing each of the nozzle tips to have a non-circular shape and to have a protrusion or a notch for rapidly cooling the molten glass and controlling the temperature condition can provide glass filaments having a flat cross-sectional shape (any cross-sectional shape except true circle shape and generally true circle shape, such as elliptical shape and long-oval shape).

Examples of the glass composition that the glass direct roving of the present embodiment may employ can include the most common E glass composition (a composition including, in terms of oxides, $SiO_2$ in the range of 52.0 to 56.0% by mass, $Al_2O_3$ in the range of 12.0 to 16.0% by mass, MgO and CaO in the range of 20.0 to 25.0% by mass in total, and $B_2O_3$ in the range of 5.0 to 10.0% by mass, with respect to the total amount of the glass fiber), a high-strength and high-modulus glass composition (a composition including $SiO_2$ in the range of 60.0 to 70.0% by mass, $Al_2O_3$ in the range of 20.0 to 30.0% by mass, MgO in the range of 5.0 to 15.0% by mass, $Fe_2O_3$ in the range of 0 to 1.5% by mass, and $Na_2O$, $K_2O$, and $Li_2O$ in the range of 0 to 0.2% by mass in total, with respect to the total amount of the glass fiber), a high-modulus and easily producible glass composition (a composition including $SiO_2$ in the range of 57.0 to 60.0% by mass, $Al_2O_3$ in the range of 17.5 to 20.0% by mass, MgO in the range of 8.5 to 12.0% by mass, CaO in the range of 10.0 to 13.0% by mass, $B_2O_3$ in the range of 0.5 to 1.5% by mass, and $SiO_2$, $Al_2O_3$, MgO, and CaO in the range of 98.0% by mass or more in total, with respect to the total amount of the glass fiber), and a low-dielectric-constant and low-dielectric-tangent glass composition (a composition including $SiO_2$ in the range of 48.0 to 62.0% by mass, $B_2O_3$ in the range of 17.0 to 26.0% by mass, $Al_2O_3$ in the range of 9.0 to 18.0% by mass, CaO in the range of 0.1 to 9.0% by mass, MgO in the range of 0 to 6.0% by mass, $Na_2O$, $K_2O$, and $Li_2O$ in the range of 0.05 to 0.5% by mass in total, $TiO_2$ in the range of 0 to 5.0% by mass, SrO in the range of 0 to 6.0% by mass, $F_2$ and $Cl_2$ in the range of 0 to 3.0% by mass in total, and $P_2O_5$ in the range of 0 to 6.0% by mass, with respect to the total amount of the glass fiber).

Regarding measurement of the content of each component described above in the glass fiber contained in the glass fiber-reinforced resin molded article of the present embodiment, the content of Li as a light element can be measured with an ICP emission spectroscopic analyzer, and the contents of other elements can be measured with a wavelength-dispersive X-ray fluorescence analyzer.

The measurement method is as follows. First, a glass batch (prepared by mixing glass raw material) or glass fiber (when organic matter is attaching to the surface of the glass fiber, or when glass fiber is mainly contained as a reinforcing material in organic matter (resin), the glass fiber is used after the organic matter is removed by, for example, heating for about 0.5 to 24 hours in a muffle furnace at 300 to 650° C.) is placed in a platinum crucible and melted with stirring while being held at a temperature of 1600° C. for 6 hours in an electric furnace to obtain a homogeneous molten glass. Next, the obtained molten glass is poured onto a carbon plate to produce a glass cullet, which is then pulverized into powder to obtain glass powder. For Li as a light element, the glass powder obtained is thermally decomposed with an acid and then quantitatively analyzed by using an ICP emission spectroscopic analyzer. For other elements, the glass powder is molded into a disc shape by a pressing machine and then quantitatively analyzed by using a wavelength-dispersive X-ray fluorescence analyzer. These quantitative analysis results are converted in terms of oxides to calculate the content of each component and the total amount, and the above-described content (% by mass) of each component can be determined from these numerical values.

In the glass direct roving of the present embodiment, the filament diameter of the glass filaments, D, is in the range of 17.5 to 21.5 μm. In order to achieve high levels of spinning productivity and LFT pellet productivity and strength of glass fiber-reinforced resin molded articles produced by using LFT pellets in combination, the filament diameter of the glass filaments, D, is preferably in the range of 17.7 to 20.4 μm, more preferably in the range of 18.0 to 19.5 μm, even more preferably in the range of 18.3 to 19.0 μm, and particularly preferably in the range of 18.5 to 18.9 μm. Here, the cross-sectional shape of the glass filaments is typically true circle shape, but may be any shape except true circle shape and generally true circle shape (e.g., elliptical shape, long-oval shape). In the case that the cross-sectional shape of the glass filaments is any shape except true circle shape and generally true circle shape, the filament diameter of the glass filaments, D, refers to the diameter of a true circle having an area equal to the area of the cross-sectional shape (referred to as reduced fiber diameter).

For calculation of the filament diameter of the glass filaments, D, for example, the glass direct roving is embedded in resin such as epoxy resin and the resin is cured, the cured resin is cut and the cross section is polished, and then the cross section of the cured resin is observed through an electron microscope; if the cross-sectional shape of each of 100 or more glass filaments exposed in the cross section is true circle shape or generally true circle shape, the diameters are measured; if the cross-sectional shape of each of the glass filaments is any shape except true circle shape and generally true circle shape, the cross-sectional areas are calculated in advance and the reduced fiber diameters are calculated on the basis of the cross-sectional areas; and then the average value of the diameters or reduced fiber diameters measured or calculated is calculated to give the filament diameter, D.

Alternatively, the measurement can be carried out by image processing using an automated analyzer for an image obtained with an electron microscope. In the case that the glass direct roving of the present embodiment is contained in an LFT pellet, for example, the LFT pellet is first heated at 625° C. for 30 minutes to burn the thermoplastic resin, the direct roving is taken out, and then the filament diameter of the glass filaments, D, can be measured with the above-described method for measurement of the filament diameter of the glass filaments, D, in the glass direct roving.

The number of the glass filaments bundled, F, constituting the glass direct roving of the present embodiment is in the range of 3000 to 7000. In order to achieve high levels of spinning productivity and LFT pellet productivity and strength of glass fiber-reinforced resin molded articles produced by using LFT pellets in combination, the number of the glass filaments bundled, F, constituting the glass direct roving of the present embodiment is preferably in the range of 3300 to 5000, and more preferably in the range of 3500 to 4500.

For determination of the number of the glass filaments bundled, F, constituting the glass direct roving of the present embodiment, for example, the glass direct roving is embedded in resin such as epoxy resin and the resin is cured, the cured resin is cut and the cross section is polished, and then the cross section of the cured resin is observed through an electron microscope; and the number of filaments constituting the glass direct roving and exposed in the cross section is counted. In the case that the glass direct roving of the present embodiment is contained in an LFT pellet, for example, the cross section of the LFT pellet is first polished, and then the number of the glass filaments bundled, F, can be determined by counting the number of filaments constituting the glass direct roving in the LFT pellet through an electron microscope.

The glass direct roving of the present embodiment has a mass in the range of 2450 to 4000 tex. In order to achieve high levels of spinning productivity and LFT pellet productivity and strength of glass fiber-reinforced resin molded articles produced by using LFT pellets in combination, the glass direct roving of the present embodiment preferably has a mass in the range of 2500 to 3500 tex, more preferably has a mass in the range of 2600 to 3300 tex, and even more preferably has a mass in the range of 2700 to 3100 tex.

The mass of the glass direct roving of the present embodiment can be measured in accordance with JIS R 3420:2013. In the case that the glass direct roving of the present embodiment is contained in an LFT pellet, the mass of the glass direct roving can be determined through calculation based on the filament diameter, D of the glass filaments, and number of the glass filaments bundled, F, measured with the above-described methods, and the specific gravity of the glass constituting the glass direct roving. For determination of the specific gravity of the glass constituting the glass direct roving, the composition of the glass constituting the glass direct roving is determined and a glass batch is prepared to give the same composition with the above-described method, the glass batch is melted and cooled to produce a glass bulk, and the specific gravity of the glass bulk is measured. If the glass composition is the E glass composition, the mass of the glass direct roving can be roughly estimated with use of a specific gravity of 2.6.

The ignition loss of the glass direct roving of the present embodiment, L, is in the range of 0.03 to 0.90%. In order to achieve high levels of spinning productivity and LFT pellet productivity and strength of glass fiber-reinforced resin molded articles produced by using LFT pellets in combination, the ignition loss of the glass direct roving of the present embodiment, L, is preferably in the range of 0.10 to 0.40%, and more preferably in the range of 0.15 to 0.30%.

The ignition loss of the glass direct roving of the present embodiment, L, can be measured in accordance with JIS R 3420:2013.

The ignition loss of the glass direct roving, L, indicates the amount of the binder attached in the glass direct roving. The binder is provided, for example, for the purpose of improvement of adhesiveness between glass fiber and resin and improvement of uniform dispersibility of glass fiber in a mixture of glass fiber and resin or inorganic material. Examples of components of the binder to be used for the glass direct roving of the present embodiment include a silane coupling agent and a film former.

Examples of the silane coupling agent include aminosilanes (such as γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane), chlorosilanes (such as γ-chloropropyltrimethoxysilane), epoxysilanes (such as γ-glycidoxypropyltrimethoxysilane, β-(3,4-epoxycyclohexyl)ethyltrimethoxysilane), mercaptosilanes (such as γ-mercaptotrimethoxysilane), vinylsilanes (such as vinyltrimethoxysilane and N-β-(N-vinylbenzylaminoethyl)-γ-aminopropyltrimethoxysilane), acrylsilanes (such as γ-methacryloxypropyltrimethoxysilane), cationic silanes (such as N-(vinylbenzyl)-2-aminoethyl-3-aminopropyltrimethoxysilane hydrochloride and N-phenyl-3-aminopropyltrimethoxysilane hydrochloride), and methacrylsilanes (such as 3-methacryloxypropylmethyldimethoxysilane, 3-methacryloxypropyltrimethoxysilane, 3-methacryloxypropylmethyldiethoxysilane, and 3-methacryloxypropyltriethoxysilane). As the silane coupling agent, these compounds can be used singly or in combination of two or more.

In the glass direct roving of the present embodiment, the attachment rate of the silane coupling agent, S, with respect to the total amount of the glass direct roving is, for example, in the range of 0.010 to 0.200% (% by mass). In order to achieve high levels of spinning productivity and LFT pellet productivity and strength of glass fiber-reinforced resin molded articles produced by using LFT pellets in combination, the attachment rate of the silane coupling agent, S, is preferably in the range of 0.020 to 0.100%, and more preferably in the range of 0.025 to 0.055%.

The attachment rate of the silane coupling agent, S, can be determined, for example, as follows. First, the glass direct roving is cut to produce a piece of 10 cm in length, which is weighed, and then the glass direct roving weighed and a solvent are put in a screw tube, which is heated on a hot plate to a predetermined temperature to extract the silane coupling agent. Specifically, washing is performed in methylene chloride solvent by heating at 45° C., and an insoluble matter is then collected by filtration and subjected to extraction twice with methanol at 70° C. and twice with water at 80° C. Next, $^1$H-NMR is measured for concentrates of the extracts, and the amount of the silane coupling agent in each extract is quantified from the integrated value by using the internal standard method (internal standard: 1,4-pyrazine). Subsequently, the sum total of the amount of the silane coupling agent in the methanol extract and the amount of the silane coupling agent in the water extract is divided by the mass of the glass direct roving, and the resulting quotient is multiplied by 100 to give the attachment rate of the silane coupling agent, S (%).

The film former is organic matter to cover the surface of glass fiber, and examples of such organic matter can include urethane resin, epoxy resin, vinyl acetate resin, acrylic resin, modified polypropylene (in particular, carboxylic acid-modified polypropylene), and copolymers of a (poly)carboxylic acid (in particular, maleic acid) and an unsaturated monomer.

The binder to be used for the glass direct roving of the present embodiment may contain a lubricant, a surfactant, an antistatic agent, and so on, in addition to the silane coupling agent and the film former.

Examples of the lubricant include modified silicone oil, animal oils (such as beef tallow) and hydrogenated products thereof, vegetable oils (such as soybean oil, coconut oil, rapeseed oil, palm oil, and castor oil) and hydrogenated products thereof, animal waxes (such as beeswax and lanolin), vegetable waxes (such as candelilla wax and carnauba wax), mineral waxes (such as paraffin wax and montan wax), condensates of a higher saturated fatty acid and a higher saturated alcohol (such as stearates such as lauryl stearate), polyethyleneimine, polyalkylpolyamine alkylamide derivatives, fatty acid amides (e.g., dehydrated condensates of polyethylenepolyamine such as diethylenetriamine, triethylenetetramine, and tetraethylenepentamine and fatty acid such as lauric acid, myristic acid, palmitic acid, and stearic acid), and quaternary ammonium salts (such as alkyltrimethylammonium salts such as lauryltrimethylammonium chloride). As the lubricant, these can be used singly or in combination of two or more.

Examples of the surfactant include nonionic surfactants, cationic surfactants, anionic surfactants, and amphoteric surfactants. As the surfactant, these compounds can be used singly or in combination of two or more.

Examples of the nonionic surfactant include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adducts, polyoxyethylene castor oil ether, hydrogenated castor oil ethylene oxide adducts, alkylamine ethylene oxide adducts, fatty acid amide ethylene oxide adducts, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, an ethylene oxide adduct of acetylene glycol, and an ethylene oxide adduct of acetylene alcohol.

Examples of the cationic surfactant include alkyldimethylbenzylammonium chloride, alkyltrimethylammonium chloride, alkyldimethylethylammonium ethylsulfate, higher alkylamine salts (such as acetate and hydrochloride), adducts of ethylene oxide to a higher alkylamine, condensates of a higher fatty acid and polyalkylene polyamine, salts of an ester of a higher fatty acid and alkanolamine, salts of a higher fatty acid amide, imidazoline cationic surfactant, and alkyl pyridinium salts.

Examples of the anionic surfactant include higher alcohol sulfate salts, higher alkyl ether sulfate salts, α-olefin sulfate salts, alkylbenzene sulfonate salts, α-olefin sulfonate salts, reaction products of a fatty acid halide and N-methyl taurine, dialkyl sulfosuccinate salts, higher alcohol phosphate ester salts, and phosphate ester salts of higher alcohol ethylene oxide adducts.

Examples of the amphoteric surfactant include amino acid amphoteric surfactants such as alkali metal salts of alkylaminopropionic acid, betaine amphoteric surfactants such as alkyldimethylbetaine, and imidazoline amphoteric surfactants.

The binder to be used for the glass direct roving of the present embodiment may contain 30 to 90% by mass of the film former, 5 to 50% by mass of the silane coupling agent, and 5 to 50% by mass of other components, in terms of solid contents. The components and composition ratio of the binder to be used for the glass direct roving of the present embodiment can be analyzed by GC-MS.

In the glass direct roving of the present embodiment, the D, F, and L satisfy the following formula (1), preferably satisfy the following formula (5), and more preferably satisfy the following formula (6):

$$1050 \leq (D^4 \times F^{1/4})/(1000 \times L^{1/6}) \leq 1640 \quad (1)$$

$$1059 \leq (D^4 \times F^{1/4})/(1000 \times L^{1/6}) \leq 1631 \quad (5)$$

$$1170 \leq (D^4 \times F^{1/4})/(1000 \times L^{1/6}) \leq 1450 \quad (6)$$

In the glass direct roving of the present embodiment, the D, F, L, and S satisfy the following formula (2), preferably satisfy the following formula (7), more preferably satisfy the following formula (3), even more preferably satisfy the following formula (4), and particularly preferably satisfy the following formula (8):

$$375 \leq (D^4 \times F^{1/4} \times S^{1/3})/(1000 \times L^{1/6}) \leq 630 \quad (2)$$

$$377 \leq (D^4 \times F^{1/4} \times S^{1/3})/(1000 \times L^{1/6}) \leq 590 \quad (7)$$

$$400 \leq (D^4 \times F^{1/4} \times S^{1/3})/(1000 \times L^{1/6}) \leq 585 \quad (3)$$

$$405 \leq (D^4 \times F^{1/4} \times S^{1/3})/(1000 \times L^{1/6}) \leq 495 \quad (4)$$

$$410 \leq (D^4 \times F^{1/4} \times S^{1/3})/(1000 \times L^{1/6}) \leq 475 \quad (8)$$

By virtue of the configuration that the glass direct roving of the present embodiment satisfies the formula (3), the glass direct roving of the present embodiment has excellent spinning productivity, and has excellent LFT pellet productivity and can impart good strength to glass fiber-reinforced resin molded articles produced by using LFT pellets. By virtue of the configuration that the glass direct roving of the present embodiment satisfies the formula (7), the glass direct roving of the present embodiment more reliably has excellent spinning productivity, and more reliably has excellent LFT pellet productivity and can more reliably impart good strength to glass fiber-reinforced resin molded articles produced by using LFT pellets. By virtue of the configuration that the glass direct roving of the present embodiment satisfies the formula (4), the glass direct roving of the present embodiment has excellent spinning productivity, and has excellent LFT pellet productivity and can impart excellent strength to glass fiber-reinforced resin molded articles produced by using LFT pellets. By virtue of the configuration that the glass direct roving of the present embodiment satisfies the formula (8), the glass direct roving of the present embodiment more reliably has excellent spinning productivity, and more reliably has excellent LFT pellet productivity and can more reliably impart excellent strength to glass fiber-reinforced resin molded articles produced by using LFT pellets.

The long glass fiber-reinforced thermoplastic resin pellet of the present embodiment comprises the above-described glass direct roving of the present embodiment and a thermoplastic resin.

Examples of the thermoplastic resin in the long glass fiber-reinforced thermoplastic resin pellet of the present embodiment can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryletherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Specific examples of the polyethylene include high-density polyethylene (HDPE), medium-density polyethylene, low-density polyethylene (LDPE), linear low-density polyethylene (LLDPE), and ultra-high-molecular-weight polyethylene.

Examples of the polypropylene include isotactic polypropylene, atactic polypropylene, syndiotactic polypropylene, and mixtures thereof.

Examples of the polystyrene include general-purpose polystyrene (GPPS), which is an atactic polystyrene having an atactic structure, high-impact polystyrene (HIPS) with a rubber component added to GPPS, and syndiotactic polystyrene, which has a syndiotactic structure.

Examples of the methacrylic resin include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, and polymers obtained by copolymerizing two or more of these.

Examples of the polyvinyl chloride include vinyl chloride homopolymers, copolymers of a vinyl chloride monomer and a copolymerizable monomer, and graft copolymers resulting from graft polymerization of a vinyl chloride monomer to a polymer, these polymers being obtained through polymerization by a conventionally known method such as an emulsion polymerization method, a suspension polymerization method, a microsuspension polymerization method, and a bulk polymerization method.

Examples of the polyamide can include one of components including polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (Nylon 1012), polyundecanamide (Nylon 11), polyundecamethylene adipamide (Nylon 116), polydodecanamide (Nylon 12), polyxylene adipamide (nylon XD6), polyxylene sebacamide (nylon XD10), polymetaxylylene adipamide (nylon MXD6), polyparaxylylene adipamide (nylon PXD6), polytetramethylene terephthalamide (nylon 4T), polypentamethylene terephthalamide (nylon 5T), polyhexamethylene terephthalamide (nylon 6T), polyhexamethylene isophthalamide (nylon 6I), polynonamethylene terephthalamide (nylon 9T), polydecamethylene terephthalamide (nylon 10T), polyundecamethylene terephthalamide (nylon 11T), polydodecamethylene terephthalamide (nylon 12T), polytetramethylene isophthalamide (nylon 4I), polybis (3-methyl-4-aminohexyl)methane terephthalamide (nylon PACMT), polybis (3-methyl-4-aminohexyl)methane isophthalamide (nylon PACMI), polybis (3-methyl-4-aminohexyl)methane dodecamide (nylon PACM12), and polybis (3-methyl-4-aminohexyl)methane tetradecamide (nylon PACM14), or copolymers obtained by combining two or more of the components, and mixtures thereof.

Examples of the polyacetal include homopolymers with oxymethylene units as the main repeating unit, and copolymers mainly composed of oxymethylene units and containing oxyalkylene units having two to eight adjacent carbon atoms in the main chain.

Examples of the polyethylene terephthalate include polymers obtained by polycondensation of terephthalic acid or a derivative thereof with ethylene glycol.

Examples of the polybutylene terephthalate include polymers obtained by polycondensation of terephthalic acid or a derivative thereof with 1,4-butanediol.

Examples of the polytrimethylene terephthalate include polymers obtained by polycondensation of terephthalic acid or a derivative thereof with 1,3-propanediol.

Examples of the polycarbonate include polymers obtained by a transesterification method in which a dihydroxydiaryl compound is reacted with a carbonate such as diphenyl carbonate in a melted state; and polymers obtained by a phosgene method in which a dihydroxyaryl compound is reacted with phosgene.

Examples of the polyarylene sulfide include linear polyphenylene sulfide, crosslinked polyphenylene sulfide having a high molecular weight obtained by performing curing reaction after polymerization, polyphenylene sulfide sulfone, polyphenylene sulfide ether, and polyphenylene sulfide ketone.

Examples of the polyphenylene ether include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly (2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether).

Examples of the modified polyphenylene ether include: polymer alloys of poly(2,6-dimethyl-1,4-phenylene) ether and polystyrene; polymer alloys of poly(2,6-dimethyl-1,4-phenylene) ether and a styrene/butadiene copolymer; polymer alloys of poly(2,6-dimethyl-1,4-phenylene) ether and styrene/maleic anhydride copolymer; polymer alloys of poly(2,6-dimethyl-1,4-phenylene) ether and polyamide; polymer alloys of poly(2,6-dimethyl-1,4-phenylene) ether and styrene/butadiene/acrylonitrile copolymer; products obtained by introducing a functional group such as an amino group, an epoxy group, a carboxy group, and a styryl group to an end of the polymer chain of the polyphenylene ether; and products obtained by introducing a functional group such as an amino group, an epoxy group, a carboxy group, a styryl group, and a methacryl group to a side chain of the polymer chain of the polyphenylene ether.

Examples of the polyaryletherketone include polyetherketone (PEK), polyetheretherketone (PEEK), polyetherketoneketone (PEKK), and polyetheretherketoneketone (PEEKK).

Examples of the liquid crystal polymer (LCP) include polymers (copolymers) that are thermotropic liquid crystal polyesters, being composed of one or more structural units selected from aromatic hydroxycarbonyl units, aromatic dihydroxy units, aromatic dicarbonyl units, aliphatic dihydroxy units, and aliphatic dicarbonyl units.

Examples of the fluororesin include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin include copolymers of an olefin or styrene and an unsaturated carboxylic acid, wherein some of carboxyl groups are neutralized with a metal ion.

Examples of the olefin/vinyl alcohol resin include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin include monocyclic compounds such as cyclohexene, polycyclic compounds such as tetracyclopentadiene, and polymers of cyclic olefin monomers.

Examples of the polylactic acid include poly-L-lactic acid, which is a homopolymer of L-form, poly-D-lactic acid, which is a homopolymer of D-form, and stereocomplex polylactic acid, which is a mixture thereof.

Examples of the cellulose resin can include methylcellulose, ethylcellulose, hydroxycellulose, hydroxymethylcellulose, hydroxyethylcellulose, hydroxyethyl methylcellulose, hydroxypropyl methylcellulose, cellulose acetate, cellulose propionate, and cellulose butyrate.

In the long glass fiber-reinforced thermoplastic resin pellet of the present embodiment, it is preferable that the thermoplastic resin be polyamide or polypropylene, due to the excellence in cost, mechanical strength, and supply stability, and of particularly high reinforcing effect by glass fiber.

In the long glass fiber-reinforced thermoplastic resin pellet of the present embodiment, the content of the glass direct roving of the present embodiment to the total amount of the long glass fiber-reinforced thermoplastic resin pellet is, for example, in the range of 10 to 70% by mass, preferably in the range of 20 to 60% by mass, and more preferably in the range of 35 to 55% by mass. In the long glass fiber-reinforced thermoplastic resin pellet of the present embodiment, the content of the thermoplastic resin to the total amount of the long glass fiber-reinforced thermoplastic resin pellet is, for example, in the range of 30 to 90% by mass, preferably in the range of 40 to 80% by mass, and more preferably in the range of 45 to 65% by mass.

The long glass fiber-reinforced thermoplastic resin pellet of the present embodiment may contain a component other than the glass direct roving of the present embodiment and the thermoplastic resin, unless achievement of the objects of the present invention is not inhibited. Examples of the component can include reinforcing fibers other than glass fiber (e.g., carbon fiber and metal fiber), fillers other than glass fiber (e.g., glass powder, talc, and mica), flame retardants, UV absorbers, heat stabilizers, antioxidants, antistatic agents, fluidity improvers, anti-blocking agents, lubricants, nucleating agents, antibacterial agents, and pigments. The long glass fiber-reinforced thermoplastic resin pellet of the present embodiment may contain these components in the range of 0 to 40% by mass in total to the total amount of the long glass fiber-reinforced thermoplastic resin pellet.

The long glass fiber-reinforced thermoplastic resin pellet of the present embodiment is obtained with a known method in which the glass direct roving of the present embodiment is allowed to pass through a through hole of a die having a through hole formed therein together with the thermoplastic resin, which has been thermally melted, and drawn from the through hole, and the glass direct roving is then cut into pieces of 1.5 to 20 mm.

The glass fiber-reinforced resin molded article of the present embodiment can be molded with a known method such as injection molding of the long glass fiber-reinforced thermoplastic resin pellet.

The glass fiber-reinforced resin molded article obtained by molding the long glass fiber-reinforced thermoplastic resin pellet of the present embodiment with a known method can be used in, for example, vehicle exterior members (such as bumpers, fenders, bonnets, air dams, wheel covers, and door mirror stays), vehicle interior members (such as door trims, ceiling materials, and combination switches), vehicle engine members (such as cylinder head covers, oil pans, engine covers, intake manifolds, intake air ducts, air pipes, cooling fans, chain guides, tensioners, orifices for engine mounts, impellers, air flow meters, ignition coil covers, actuator cases, quick connectors, and exhaust manifolds), vehicle electrical components, vehicle mechanism components (pedal modules, shift lever bases, pulleys, seal rings, gears, bearings), vehicle muffler components (such as silencers), electronic device housings, other electronic components (connectors, sockets, and LED-sealing materials), high-pressure tanks, and the like.

Next, Examples and Comparative Examples of the glass direct roving of the present invention will be demonstrated.

EXAMPLES

Example 1

In the present Example, first, a glass raw material (glass batch) prepared to have the E glass composition was fed to a melting furnace and melted, and the melted glass batch (molten glass) was drawn from nozzle tips of a bushing provided with 4000 nozzle tips and controlled at a predetermined temperature, and rapidly cooled to form glass filaments, to which a binder containing a silane coupling agent, a film former, a lubricant, and a surfactant was applied, and 4000 glass filaments were bundled together and wound around a tube to obtain a glass direct roving of Example 1, where the filament diameter of the glass filaments, D, was 18.7 μm, the number of the glass filaments bundled, F, was 4000, the mass was 2800 tex, the ignition loss, L, was 0.20%, and the attachment rate of the silane coupling agent, S, was 0.035%.

For the glass direct roving obtained in the present Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$. In Table 1, D^4 indicates $D^4$, F^(¼) indicates $F^{1/4}$, L^(⅙) indicates $L^{1/6}$, and S^(⅓) indicates $S^{1/3}$.

Next, the glass direct roving obtained in the present Example was introduced into an impregnation tank filled with melted polypropylene (manufactured by Sumitomo Chemical Co., Ltd., product name: NOBLEN U501E1) and allowed to pass through the impregnation tank with application of tension to impregnate the glass direct roving with the resin. Subsequently, the glass direct roving impregnated with polypropylene after passing through the impregnation tank was cooled while being conveyed, and cut into pieces of 6 mm in length to obtain long glass fiber-reinforced thermoplastic resin pellets (LFT pellets) of Example 1.

Next, the long glass fiber-reinforced thermoplastic resin pellets obtained in the present Example were injection-molded with an injection molding apparatus (manufactured by Nissei Plastic Industrial Co. Ltd., product name: NEX80) to obtain a glass fiber-reinforced resin molded article of Example 1.

The tensile strength, bending strength, and Charpy impact strength of the glass fiber-reinforced resin molded article obtained in the present Example were measured in a manner described below. In addition, the spinning productivity in obtaining the glass direct roving of the present Example and the LFT pellet productivity in obtaining the long glass fiber-reinforced thermoplastic resin pellets of the present Example were evaluated in a manner described below. Table 1 shows the results. Percentages shown in the rows for tensile strength, bending strength, and Charpy impact strength in Table 1 are values as the tensile strength, bending strength, and Charpy impact strength of a glass fiber-reinforced resin molded article of Reference Example 1 described later were each assumed as 100%.

[Tensile Strength of Glass Fiber-Reinforced Resin Molded Article]

An A-type dumbbell test piece (thickness: 4 mm) in accordance with JIS K 7165:2008 was produced with use of the LFT pellets obtained in the present Example, and a static tensile test in accordance with JIS K 7165:2008 was carried out for the test piece under a test temperature of 23° C. with use of a precision universal tester (manufactured by Shimadzu Corporation, product name: Autograph AG-5000B) to measure the tensile strength.

[Bending Strength of Glass Fiber-Reinforced Resin Molded Article]

An A-type dumbbell test piece (thickness: 4 mm) in accordance with JIS K 7165:2008 was produced with use of the LFT pellets obtained in the present Example, and a static tensile test in accordance with JIS K 7171:2016 was carried out for the test piece under a test temperature of 23° C. with use of a precision universal tester (manufactured by Shimadzu Corporation, product name: Autograph AG-5000B) to measure the bending strength.

[Charpy Impact Strength of Glass Fiber-Reinforced Resin Molded Article]

An A-type dumbbell test piece (thickness: 4 mm) in accordance with JIS K 7165:2008 was produced with use of the LFT pellets obtained in the present Example, and the both ends of the dumbbell test piece were cut to produce a strip test piece of 80 mm in length, which was notched, and a Charpy notched impact strength test in accordance with JIS K 7111-1 was carried out under a test temperature of 23° C. to measure the Charpy impact strength.

[Spinning Productivity of Glass Direct Roving]

Production (spinning) of the glass direct roving was performed for 8 hours, and the thread break frequency during the period was measured. Cases with a thread break frequency of once/hour or lower were rated as "A", cases with a thread break frequency of higher than once/hour and three times/hour or lower as "B", and cases with a thread break frequency of higher than three times/hour as "C".

[LFT Pellet Productivity]

The frequency of breaking of the glass direct roving due to splitting or the like in the resin impregnation tank was measured in production of the LFT pellets in an amount corresponding to 8000 m with conveyance at different speeds in the range of 20 to 100 m/min.

Example 2

A glass direct roving of Example 2 was obtained in the completely same manner as in Example 1 except that the drawing speed for the glass filaments was adjusted, where the glass direct roving was such that the filament diameter of the glass filaments, D, was 19.9 μm, the number of glass filaments bundled, F, was 4000, the mass was 3200 tex, the ignition loss, L, was 0.20%, and the attachment rate of the silane coupling agent, S, was 0.045%.

For the glass direct roving obtained in the present Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass direct roving obtained in the present Example was used, and the tensile strength, bending strength, and Charpy impact strength of the glass fiber-reinforced resin molded article obtained in the present Example, the spinning productivity in obtaining the glass direct roving of the present Example, and the LFT pellet productivity in obtaining the long glass fiber-reinforced thermoplastic resin pellets of the present Example were measured or evaluated in the completely same manner as in Example 1. Table 1 shows the results. Percentages shown in the rows for tensile strength, bending strength, and Charpy impact strength in Table 1 are values as the tensile strength, bending strength, and Charpy impact strength of a glass fiber-reinforced resin molded article of Reference Example 1 described later were each assumed as 100%.

Example 3

A glass direct roving of Example 3 was obtained in the completely same manner as in Example 1 except that the composition of the binder and the amount of the binder to be applied were adjusted, where the glass direct roving was such that the filament diameter of the glass filaments, D, was 18.7 m, the number of the glass filaments bundled, F, was 4000, the mass was 2800 tex, the ignition loss, L, was 0.60%, and the attachment rate of the silane coupling agent, S, was 0.045%.

For the glass direct roving obtained in the present Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass direct roving obtained in the present Example was used, and the tensile strength, bending strength, and Charpy impact strength of the glass fiber-reinforced resin molded article obtained in the present Example, the spinning productivity in obtaining the glass direct roving of the present Example, and the LFT pellet productivity in obtaining the long glass fiber-reinforced thermoplastic resin pellets of the present Example were measured or evaluated in the completely same manner as in Example 1. Table 1 shows the results. Percentages shown in the rows for tensile strength, bending strength, and Charpy impact strength in Table 1 are values as the tensile strength, bending strength, and Charpy impact strength of a glass fiber-reinforced resin molded article of Reference Example 2 described later were each assumed as 100%.

Example 4

A glass direct roving of Example 4 was obtained in the completely same manner as in Example 1 except that the composition of the binder was adjusted, where the glass direct roving was such that the filament diameter of the glass filaments, D, was 18.7 μm, the number of the glass filaments bundled, F, was 4000, the mass was 2800 tex, the ignition loss, L, was 0.20%, and the attachment rate of the silane coupling agent, S, was 0.100%.

For the glass direct roving obtained in the present Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass direct roving obtained in the present Example was used, and the tensile strength, bending strength, and Charpy impact strength of the glass fiber-reinforced resin molded article obtained in the present Example, the spinning productivity in obtaining the glass direct roving of the present Example, and the LFT pellet productivity in obtaining the long glass fiber-reinforced thermoplastic resin pellets of the present Example were measured or evaluated in the completely same manner as in Example 1. Table 1 shows the results. Percentages shown in the rows for tensile strength, bending strength, and Charpy impact strength in Table 1 are values as the tensile strength, bending strength, and Charpy impact strength of a glass fiber-reinforced resin molded article of Reference Example 1 described later were each assumed as 100%.

Comparative Example 1

A glass direct roving of Comparative Example 1 was obtained in the completely same manner as in Example 1 except that a bushing including 4650 nozzle tips was used and the drawing speed for the glass filaments was adjusted, where the glass direct roving was such that the filament diameter of the glass filaments, D, was 17.3 μm, the number of the glass filaments bundled, F, was 4650, the mass was 2800 tex, the ignition loss, L, was 0.20%, and the attachment rate of the silane coupling agent, S, was 0.035%.

For the glass direct roving obtained in the present Comparative Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass direct roving obtained in the present Comparative Example was used, and the tensile strength, bending strength, and Charpy impact strength of the glass fiber-reinforced resin molded article obtained in the present Comparative Example, the spinning productivity in obtaining the glass direct roving of the present Comparative Example, and the LFT pellet productivity in obtaining the long glass fiber-reinforced thermoplastic resin pellets of the present Comparative Example were measured or evaluated in the completely same manner as in Example 1. Table 1 shows the results. Percentages shown in the rows for tensile strength, bending strength, and Charpy impact strength in Table 1 are values as the tensile strength, bending strength, and Charpy impact strength of a glass fiber-reinforced resin molded article of Reference Example 1 described later were each assumed as 100%.

Comparative Example 2

A glass direct roving of Comparative Example 2 was obtained in the completely same manner as in Example 1 except that a bushing including 6000 nozzle tips was used and the drawing speed for the glass filaments was adjusted, where the glass direct roving was such that the filament diameter of the glass filaments, D, was 17.3 μm, the number of the glass filaments bundled, F, was 6000, the mass was 3600 tex, the ignition loss, L, was 0.20%, and the attachment rate of the silane coupling agent, S, was 0.035%.

For the glass direct roving obtained in the present Comparative Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass direct roving obtained in the present Comparative Example was used, and the tensile strength, bending strength, and Charpy impact strength of the glass fiber-reinforced resin molded article obtained in the present Comparative Example, the spinning productivity in obtaining the glass direct roving of the present Comparative Example, and the LFT pellet productivity in obtaining the long glass fiber-reinforced thermoplastic resin pellets of the present Comparative Example were measured or evaluated in the completely same manner as in Example 1. Table 1 shows the results. Percentages shown in the rows for tensile strength, bending strength, and Charpy impact strength in Table 1 are values as the tensile strength, bending strength, and Charpy impact strength of a glass fiber-reinforced resin molded article of Reference Example 1 described later were each assumed as 100%.

Comparative Example 3

A glass direct roving of Comparative Example 3 was obtained in the completely same manner as in Example 1 except that the drawing speed for the glass filaments was adjusted, where the glass direct roving was such that the filament diameter of the glass filaments, D, was 21.2 μm, the number of the glass filaments bundled, F, was 4000, the mass was 3600 tex, the ignition loss, L, was 0.20%, and the attachment rate of the silane coupling agent, S, was 0.035%.

For the glass direct roving obtained in the present Comparative Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass direct roving obtained in the present Comparative Example was used, and the tensile strength, bending strength, and Charpy impact strength of the glass fiber-reinforced resin molded article obtained in the present Comparative Example, the spinning productivity in obtaining the glass direct roving of the present Comparative Example, and the LFT pellet productivity in obtaining the long glass fiber-reinforced thermoplastic resin pellets of the present Comparative Example were measured or evaluated in the completely same manner as in Example 1. Table 1 shows the results. Percentages shown in the rows for tensile strength, bending strength, and Charpy impact strength in Table 1 are values as the tensile strength, bending strength, and Charpy impact strength of a glass fiber-reinforced resin molded article of Reference Example 1 described later were each assumed as 100%.

Comparative Example 4

A glass direct roving of Comparative Example 4 was obtained in the completely same manner as in Example 1 except that the composition of the binder and the amount of the binder to be applied were adjusted, where the glass direct roving was such that the filament diameter of the glass filaments, D, was 18.7 μm, the number of the glass filaments bundled, F, was 4000, the mass was 2800 tex, the ignition loss, L, was 0.04%, and the attachment rate of the silane coupling agent, S, was 0.010%.

For the glass direct roving obtained in the present Comparative Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass direct roving obtained in the present Comparative Example was used, and the tensile strength, bending strength, and Charpy impact strength of the glass fiber-reinforced resin molded article obtained in the present Comparative Example, the spinning productivity in obtaining the glass direct roving of the present Comparative Example, and the LFT pellet productivity in obtaining the long glass fiber-reinforced thermoplastic resin pellets of the present Comparative Example were measured or evaluated in the completely same manner as in Example 1. Table 1 shows the results.

Comparative Example 5

A glass direct roving of Comparative Example 5 was obtained in the completely same manner as in Example 1 except that the composition of the binder and the amount of the binder to be applied were adjusted, where the glass direct roving was such that the filament diameter of the glass filaments, D, was 18.7 μm, the number of the glass filaments bundled, F, was 4000, the mass was 2800 tex, the ignition loss, L, was 0.80%, and the attachment rate of the silane coupling agent, S, was 0.050%.

For the glass direct roving obtained in the present Comparative Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass direct roving obtained in the present Comparative Example was used, and the tensile strength, bending strength, and Charpy impact strength of the glass fiber-reinforced resin molded article obtained in the present Comparative Example, the spinning productivity in obtaining the glass direct roving of the present Comparative Example, and the LFT pellet productivity in obtaining the long glass fiber-reinforced thermoplastic resin pellets of the present Comparative Example were measured or evaluated in the completely same manner as in Example 1. Table 1 shows the results.

Comparative Example 6

A glass raw material (glass batch) prepared to have the E glass composition was fed to a melting furnace and melted, and the melted glass batch (molten glass) was drawn from nozzle tips of a bushing controlled at a predetermined temperature, and rapidly cooled to form glass filaments, to which a binder containing a film former, a silane coupling agent, a lubricant, and a surfactant was applied, and 800 glass filaments were bundled together and wound around a tube to obtain glass strands, where the mass was 560 tex and the filament diameter of the glass filaments, D, was 18.7 μm. Next, five strands of the glass strands were paralleled while being unraveled from the tube to obtain a glass combined roving of Comparative Example 6, where the filament diameter of the glass filaments, D, was 18.7 μm, the number of the glass filaments bundled, F, was 4000, the mass was 2800 tex, the ignition loss, L, was 0.20%, and the attachment rate of the silane coupling agent, S, was 0.035%.

For the glass combined roving obtained in the present Comparative Example, Table 1 shows the filament diameter of the glass filaments, D, constituting the glass combined roving, the number of the glass filaments bundled, F, the mass of the glass combined roving, the ignition loss of the glass combined roving, L, the attachment rate of the silane coupling agent, S, in the glass combined roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass combined roving obtained in the present Comparative Example was used, and the tensile strength, bending strength, and Charpy impact strength of the glass fiber-reinforced resin molded article obtained in the present Comparative Example, the spinning productivity in obtaining the glass combined roving of the present Comparative Example, and the LFT pellet productivity in obtaining the long glass fiber-reinforced thermoplastic resin pellets of the present Comparative Example were measured or evaluated in the completely same manner as in Example 1. Table 1 shows the results. Percentages shown in the rows for tensile strength, bending strength, and Charpy impact strength in Table 1 are values as the tensile strength, bending strength, and Charpy impact strength of a glass fiber-reinforced resin molded article of Reference Example 1 described later were each assumed as 100%.

Reference Example 1

A glass direct roving of Reference Example 1 was obtained in the completely same manner as in Example 1 except that the drawing speed for the glass filaments was adjusted, where the glass direct roving was such that the filament diameter of the glass filaments, D, was 17.3 μm, the number of the glass filaments bundled, F, was 4000, the mass was 2400 tex, the ignition loss, L, was 0.20%, and the attachment rate of the silane coupling agent, S, was 0.035%.

For the glass direct roving obtained in the present Reference Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass direct roving obtained in the present Reference Example was used, and the tensile strength, bending strength, and Charpy impact strength of the glass fiber-reinforced resin molded article obtained in the present Reference Example, the spinning productivity in obtaining the glass direct roving of the present Reference Example, and the LFT pellet productivity in obtaining the long glass fiber-reinforced thermoplastic resin pellets of the present Reference Example were measured or evaluated in the completely same manner as in Example 1. Table 1 shows the results.

Reference Example 2

A glass direct roving of Reference Example 2 was obtained in the completely same manner as in Example 1 except that the composition of the binder and the amount of the binder to be applied and the drawing speed for the glass filaments were adjusted, where the glass direct roving was such that the filament diameter of the glass filaments, D, was 17.3 μm, the number of the glass filaments bundled, F, was 4000, the mass was 2400 tex, the ignition loss, L, was 0.60%, and the attachment rate of the silane coupling agent, S, was 0.045%.

For the glass direct roving obtained in the present Reference Example, Table 1 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$.

Next, long glass fiber-reinforced thermoplastic resin pellets and a glass fiber-reinforced resin molded article were produced in the completely same manner as in Example 1 except that the glass direct roving obtained in the present Reference Example was used, and the tensile strength, bending strength, and Charpy impact strength of the glass fiber-reinforced resin molded article obtained in the present Reference Example, the spinning productivity in obtaining the glass direct roving of the present Reference Example, and the LFT pellet productivity in obtaining the long glass fiber-reinforced thermoplastic resin pellets of the present Reference Example were measured or evaluated in the completely same manner as in Example 1. Table 1 shows the results.

Example 5

In the present Example, first, a glass raw material (glass batch) prepared to have the E glass composition was fed to a melting furnace and melted, and the melted glass batch (molten glass) was drawn from nozzle tips of a bushing provided with 4000 nozzle tips and controlled at a predetermined temperature, and rapidly cooled to form glass filaments, to which a binder containing a silane coupling agent, a film former, a lubricant, and a surfactant was applied, and 4000 glass filaments were bundled together and wound around a tube to obtain a glass direct roving of Example 5, where the filament diameter of the glass filaments, D, was 18.7 μm, the number of the glass filaments bundled, F, was 4000, the mass was 2800 tex, the ignition loss, L, was 0.20%, and the attachment rate of the silane coupling agent, S, was 0.035%.

For the glass direct roving obtained in the present Example, Table 2 shows the filament diameter of the glass filaments, D, constituting the glass direct roving, the number of the glass filaments bundled, F, the mass of the glass direct roving, the ignition loss of the glass direct roving, L, the attachment rate of the silane coupling agent, S, in the glass direct roving, the value of $(D^4 \times F^{1/4})/(1000 \times L^{1/6})$, and the value of $(D^4 \times F^{1/4} \times S^{1/3})/(1000 \times L^{1/6})$. In Table 2, D^4 indicates $D^4$, F^(¼) indicates $F^{1/4}$, L^(⅙) indicates $L^{1/6}$, and S^(⅓) indicates $S^{1/3}$.

Next, the glass direct roving obtained in the present Example was introduced into an impregnation tank filled with melted polyamide (manufactured by Ube Industries, Ltd., product name: UBE 1010X) and allowed to pass through the impregnation tank with application of tension to impregnate the glass direct roving with the resin. Subsequently, the glass direct roving impregnated with polyamide after passing through the impregnation tank was cooled while being conveyed, and cut into pieces of 3 mm in length to obtain long glass fiber-reinforced thermoplastic resin pellets (LFT pellets) of Example 5.

Next, the long glass fiber-reinforced thermoplastic resin pellets obtained in the present Example were injection-molded with an injection molding apparatus (manufactured by Nissei Plastic Industrial Co. Ltd., product name: NEX80) to obtain a glass fiber-reinforced resin molded article of Example 5.

The tensile strength, bending strength, and Charpy impact strength of the glass fiber-reinforced resin molded article obtained in the present Example, the spinning productivity in obtaining the glass direct roving of the present Example, and the LFT pellet productivity in obtaining the long glass fiber-reinforced thermoplastic resin pellets of the present Example were measured or evaluated in the completely same manner as in Example 1. Table 2 shows the results. Percentages shown in the rows for tensile strength, bending strength, and Charpy impact strength in Table 2 are values as the tensile strength, bending strength, and Charpy impact strength of a glass fiber-reinforced resin molded article of Reference Example 3 described later were each assumed as 100%.

Example 6

Long glass fiber-reinforced thermoplastic resin pellets and a glass fiber-reinforced resin molded article of Example 6 were produced in the completely same manner as in Example 5 except that the glass direct roving of Example 2 was used.

The tensile strength, bending strength, and Charpy impact strength of the glass fiber-reinforced resin molded article obtained in the present Example, the spinning productivity in obtaining the glass direct roving of the present Example, and the LFT pellet productivity in obtaining the long glass fiber-reinforced thermoplastic resin pellets of the present Example were measured or evaluated in the completely same manner as in Example 1. Table 2 shows the results. Percentages shown in the rows for tensile strength, bending strength, and Charpy impact strength in Table 2 are values as the tensile strength, bending strength, and Charpy impact strength of a glass fiber-reinforced resin molded article of Reference Example 3 described later were each assumed as 100%.

Comparative Example 7

Long glass fiber-reinforced thermoplastic resin pellets and a glass fiber-reinforced resin molded article of Comparative Example 7 were produced in the completely same manner as in Example 5 except that the glass direct roving of Comparative Example 1 was used.

The tensile strength, bending strength, and Charpy impact strength of the glass fiber-reinforced resin molded article obtained in the present Comparative Example, the spinning productivity in obtaining the glass direct roving of the present Comparative Example, and the LFT pellet productivity in obtaining the long glass fiber-reinforced thermoplastic resin pellets of the present Comparative Example were measured or evaluated in the completely same manner as in Example 1. Table 2 shows the results. Percentages shown in the rows for tensile strength, bending strength, and Charpy impact strength in Table 2 are values as the tensile strength, bending strength, and Charpy impact strength of a glass fiber-reinforced resin molded article of Reference Example 3 described later were each assumed as 100%.

Comparative Example 8

Long glass fiber-reinforced thermoplastic resin pellets and a glass fiber-reinforced resin molded article of Comparative Example 8 were produced in the completely same manner as in Example 5 except that the glass direct roving of Comparative Example 2 was used.

The tensile strength, bending strength, and Charpy impact strength of the glass fiber-reinforced resin molded article obtained in the present Comparative Example, the spinning productivity in obtaining the glass direct roving of the present Comparative Example, and the LFT pellet productivity in obtaining the long glass fiber-reinforced thermoplastic resin pellets of the present Comparative Example were measured or evaluated in the completely same manner as in Example 1. Table 2 shows the results. Percentages shown in the rows for tensile strength, bending strength, and Charpy impact strength in Table 2 are values as the tensile strength, bending strength, and Charpy impact strength of a glass fiber-reinforced resin molded article of Reference Example 3 described later were each assumed as 100%.

Comparative Example 9

Long glass fiber-reinforced thermoplastic resin pellets and a glass fiber-reinforced resin molded article of Comparative Example 9 were produced in the completely same manner as in Example 5 except that the glass direct roving of Comparative Example 3 was used.

The tensile strength, bending strength, and Charpy impact strength of the glass fiber-reinforced resin molded article obtained in the present Comparative Example, the spinning productivity in obtaining the glass direct roving of the present Comparative Example, and the LFT pellet productivity in obtaining the long glass fiber-reinforced thermoplastic resin pellets of the present Comparative Example were measured or evaluated in the completely same manner as in Example 1. Table 2 shows the results. Percentages shown in the rows for tensile strength, bending strength, and Charpy impact strength in Table 2 are values as the tensile strength, bending strength, and Charpy impact strength of a glass fiber-reinforced resin molded article of Reference Example 3 described later were each assumed as 100%.

Reference Example 3

Long glass fiber-reinforced thermoplastic resin pellets and a glass fiber-reinforced resin molded article of Reference Example 3 were produced in the completely same manner as in Example 5 except that the glass direct roving of Reference Example 1 was used.

The tensile strength, bending strength, and Charpy impact strength of the glass fiber-reinforced resin molded article obtained in the present Reference Example, the spinning productivity in obtaining the glass direct roving of the present Reference Example, and the LFT pellet productivity in obtaining the long glass fiber-reinforced thermoplastic resin pellets of the present Reference Example were measured or evaluated in the completely same manner as in Example 1. Table 2 shows the results.

TABLE 1

| | | Example 1 | Example 2 | Example 3 | Example 4 | Comparative Example 1 | Comparative Example 2 | Comparative Example 3 |
|---|---|---|---|---|---|---|---|---|
| Glass fiber | Type of roving | direct | direct | direct | direct | direct | direct | direct |
| | Filament diameter, D (μm) | 18.7 | 19.9 | 18.7 | 18.7 | 17.3 | 17.3 | 21.2 |
| | Number of filaments bundled, F | 4000 | 4000 | 4000 | 4000 | 4650 | 6000 | 4000 |
| | Mass of roving (tex) | 2800 | 3200 | 2800 | 2800 | 2800 | 3600 | 3600 |
| | Ignition loss, L (%) | 0.20 | 0.20 | 0.60 | 0.20 | 0.20 | 0.20 | 0.20 |
| | Attachment rate of silane coupling agent, S (%) | 0.035 | 0.045 | 0.045 | 0.100 | 0.035 | 0.035 | 0.035 |
| | $D^4 \times F^{(1/4)}/(1000 \times L^{(1/6)})$ | 1272 | 1631 | 1059 | 1272 | 967 | 1031 | 2101 |
| | $D^4 \times F^{(1/4)} \times S^{(1/3)}/(1000 \times L^{(1/6)})$ | 416 | 580 | 377 | 590 | 316 | 337 | 687 |
| Resin Molded article | Type | PP | PP | PP | PP | PP | PP | PP |
| | Glass content (% by mass) | 40 | 40 | 40 | 40 | 40 | 40 | 40 |
| Evaluation items | Tensile strength [strength ratio to Reference Example] (MPa) | 119 [99%] | 115 [96%] | 113 [96%] | 114 [95%] | 120 [100%] | 121 [101%] | 109 [91%] |
| | Bending strength [strength ratio to Reference Example] (MPa) | 174 [99%] | 170 [97%] | 167 [98%] | 169 [97%] | 173 [99%] | 174 [99%] | 160 [94%] |
| | Chaipy impact strength [strength ratio to Reference Example] (kJ/m²) | 20 [100%] | 19 [95%] | 19 [95%] | 19 [95%] | 20 [100%] | 20 [100%] | 19 [95%] |
| | Spinning productivity | A | A | A | A | C | C | A |
| | LFT pellet productivity | A | A | B | B | A | A | A |

TABLE 1-continued

|  |  | Comparative Example 4 | Comparative Example 5 | Comparative Example 6 | Reference Example 1 | Reference Example 2 |
|---|---|---|---|---|---|---|
| Glass fiber | Type of roving | direct | direct | combined | direct | direct |
|  | Filament diameter, D (μm) | 18.7 | 18.7 | 18.7 | 17.3 | 17.3 |
|  | Number of filaments bundled, F | 4000 | 4000 | 4000 | 4000 | 4000 |
|  | Mass of roving (tex) | 2800 | 2800 | 2800 | 2400 | 2400 |
|  | Ignition loss, L (%) | 0.04 | 0.80 | 0.20 | 0.20 | 0.60 |
|  | Attachment rate of silane coupling agent, S (%) | 0.010 | 0.050 | 0.035 | 0.035 | 0.045 |
|  | $D^4 \times F^{(1/4)}/(1000 \times L^{(1/6)})$ | 1663 | 1009 | 1272 | 932 | 776 |
|  | $D^4 \times F^{(1/4)} \times S^{(1/3)}/(1000 \times L^{(1/6)})$ | 358 | 372 | 416 | 305 | 276 |
| Resin | Type | PP | PP | PP | PP | PP |
| Molded article | Glass content (% by mass) | 40 | 40 | 40 | 40 | 40 |
| Evaluation items | Tensile strength [strength ratio to Reference Example] (MPa) | 109 [−] | 105 [−] | 120 | 120 [100%] | 118 |
|  | Bending strength [strength ratio to Reference Example] (MPa) | 159 [−] | 155 [−] | 172 [98%] | 175 | 170 |
|  | Charpy impact strength [strength ratio to Reference Example] (kJ/m²) | 19 [−] | 18 [−] | 20 [100%] | 20 | 20 |
|  | Spinning productivity | A | A | A | B | B |
|  | LFT pellet productivity | C |  | C | C | C |

TABLE 2

|  |  | Example 5 | Example 6 | Comparative Example 7 | Comparative Example 8 | Comparative Example 9 | Reference Example 3 |
|---|---|---|---|---|---|---|---|
| Glass fiber | Type of roving | direct | direct | direct | direct | direct | direct |
|  | Filament diameter, D (μm) | 18.7 | 19.9 | 17.3 | 17.3 | 21.2 | 17.3 |
|  | Number of filaments bundled, F | 4000 | 4000 | 4650 | 6000 | 4000 | 4000 |
|  | Mass of roving (tex) | 2800 | 3200 | 2800 | 3600 | 3600 | 2400 |
|  | Ignition loss, L (%) | 0.20 | 0.20 | 0.20 | 0.20 | 0.20 | 0.20 |
|  | Attachment rate of silane coupling agent, S (%) | 0.035 | 0.045 | 0.035 | 0.035 | 0.035 | 0.035 |
|  | $D^4 \times F^{(1/4)}/(1000 \times L^{(1/6)})$ | 1272 | 1631 | 967 | 1031 | 2101 | 932 |
|  | $D^4 \times F^{(1/4)} \times S^{(1/3)}/(1000 \times L^{(1/6)})$ | 416 | 580 | 316 | 337 | 687 | 305 |
| Resin | Type | PA6 | PA6 | PA6 | PA6 | PA6 | PA6 |
| Molded article | Glass content (% by mass) | 50 | 50 | 50 | 50 | 50 | 50 |
| Evaluation items | Tensile strength [strength ratio to Reference Example] (MPa) | 228 [99%] | 221 [96%] | 231 [100%] | 229 [100%] | 215 [93%] | 230 |
|  | Bending strength [strength ratio to Reference Example] (MPa) | 359 [100%] | 351 [98%] | 362 [101%] | 361 [100%] | 340 [94%] | 360 |
|  | Charpy impact strength [strength ratio to Reference Example] (kJ/m²) | 35 [97%] | 35 [97%] | 35 [97%] | 35 [97%] | 34 [94%] | 36 |
|  | Spinning productivity | A | A | C | C | A | B |
|  | LFT pellet productivity | A | A | A | A | A | C |

As is revealed from Tables 1 and 2, it is clear that each of the glass direct rovings of Examples 1 to 6, which are such that the filament diameter of the glass filaments, D, is in the range of 17.5 to 21.5 μm, the number of the glass filaments bundled, F, is in the range of 3000 to 7000, the mass of the glass direct roving is in the range of 2450 to 4000 tex, the ignition loss of the glass direct roving, L, is in the range of 0.03 to 0.90%, and the D, F, and L satisfy the following formula (1):

$$1050 \leq \left(D^4 \times F^{1/4}\right) / \left(1000 \times L^{1/6}\right) \leq 1640 \quad (1)$$

has excellent spinning productivity, and has good LFT pellet productivity and can impart good strength to glass fiber-reinforced resin molded articles produced by using LFT pellets.

In contrast to this, each of the glass direct rovings of Comparative Examples 1 to 5 and Comparative Examples 7 to 9, which are such that the value of $(D^4 \times F^{1/4})/(1000 \times L^{1/6})$ is less than 1050 or more than 1640, failed to achieve sufficient performance in any of spinning productivity, LFT pellet productivity, and strength of a glass fiber-reinforced resin molded article produced by using LFT pellets.

Sufficient LFT pellet productivity was not achieved with the glass combined roving of Comparative Example 6, which is not a glass direct roving.

The invention claimed is:

1. A glass direct roving comprising a plurality of glass filaments bundled together, wherein
    a filament diameter of the glass filaments, D, is in a range of 17.5 to 21.5 μm,
    a number of the glass filaments bundled, F, is in a range of 3000 to 7000,
    a mass of the glass direct roving is in a range of 2450 to 4000 tex,
    an ignition loss of the glass direct roving, L, is in a range of 0.03 to 0.40%,
    an attachment rate of a silane coupling agent S, to a total amount of the glass direct roving is in a range of 0.010 to 0.055%, and
    the D, F, and L satisfy a following formula (1):

$$1050 \leq \left(D^4 \times F^{1/4}\right) / \left(1000 \times L^{1/6}\right) \leq 1640. \tag{1}$$

2. The glass direct roving according to claim 1, wherein the D, F, L, and S satisfy a following formula (2):

$$375 \leq \left(D^4 \times F^{1/4} \times S^{1/3}\right) / \left(1000 \times L^{1/6}\right) \leq 630. \tag{2}$$

3. The glass direct roving according to claim 2, wherein the D, F, L, and S satisfy a following formula (3):

$$400 \leq \left(D^4 \times F^{1/4} \times S^{1/3}\right) / \left(1000 \times L^{1/6}\right) \leq 585. \tag{3}$$

4. The glass direct roving according to claim 2, wherein the D, F, L, and S satisfy a following formula (4):

$$405 \leq \left(D^4 \times F^{1/4} \times S^{1/3}\right) / \left(1000 \times L^{1/6}\right) \leq 495. \tag{4}$$

5. A long glass fiber-reinforced thermoplastic resin pellet comprising the glass direct roving according to claim 1 and a thermoplastic resin.

6. The long glass fiber-reinforced thermoplastic resin pellet according to claim 5, wherein the thermoplastic resin is polypropylene or polyamide.

* * * * *